(12) United States Patent
Huang et al.

(10) Patent No.: US 11,947,987 B2
(45) Date of Patent: Apr. 2, 2024

(54) LIVE NODE IMAGING

(71) Applicant: Dell Products L.P., Round Rock, TX (US)

(72) Inventors: Li Huang, Shanghai (CN); Kai Zhou, Shanghai (CN); Zheng Zhang, Shanghai (CN); Harold A. Hager, Jr., Hopkinton, MA (US); Qi Zhang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 308 days.

(21) Appl. No.: 16/891,641

(22) Filed: Jun. 3, 2020

(65) Prior Publication Data

US 2021/0382738 A1 Dec. 9, 2021

(51) Int. Cl.
*G06F 9/44* (2018.01)
*G06F 9/445* (2018.01)
*G06F 9/455* (2018.01)
*H04L 9/32* (2006.01)

(52) U.S. Cl.
CPC ...... *G06F 9/45558* (2013.01); *G06F 9/44536* (2013.01); *G06F 9/44578* (2013.01); *H04L 9/3247* (2013.01); *G06F 2009/45562* (2013.01)

(58) Field of Classification Search
CPC ............. G06F 9/45558; G06F 9/44536; G06F 9/44578; H04L 9/3247
See application file for complete search history.

(56) References Cited

U.S. PATENT DOCUMENTS

| | | | | |
|---|---|---|---|---|
| 9,292,332 B1* | 3/2016 | Liguori | ................... | H04L 49/70 |
| 2007/0118641 A1* | 5/2007 | Zhuo | ..................... | G06F 21/554 |
| | | | | 709/224 |
| 2014/0068585 A1* | 3/2014 | Young | ................... | G06F 21/572 |
| | | | | 717/168 |
| 2014/0325140 A1* | 10/2014 | Haug | ........................ | G06F 8/63 |
| | | | | 711/112 |
| 2016/0055078 A1* | 2/2016 | Mcdonough | ........ | G06F 9/45558 |
| | | | | 717/131 |
| 2017/0270301 A1* | 9/2017 | Vidyadhara | ........... | G06F 9/4411 |
| 2019/0187977 A1* | 6/2019 | Szwarc | ..................... | G06F 8/63 |

* cited by examiner

*Primary Examiner* — Hang Pan
(74) *Attorney, Agent, or Firm* — Jackson Walker L.L.P.

(57) ABSTRACT

An information handling system may include at least one processor; and a non-transitory memory coupled to the at least one processor. The information handling system may be a node of an information handling system cluster may be configured to be imaged while the node is operational within the information handling system cluster by: a node installation service executing on the node creating a partition on a storage medium of the node; the node installation service receiving an image bundle from a remote information handling system via a network and storing the image bundle on the partition; and the node installation service causing the node to reboot, wherein the rebooting is configured to install a new version of a management system to the node from the image bundle.

20 Claims, 2 Drawing Sheets

LIVE NODE IMAGING

TECHNICAL FIELD

The present disclosure relates in general to information handling systems, and more particularly to imaging of servers in a cluster environment such as a hyper-converged infrastructure (HCI) cluster.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers.

Sometimes a node of an HCI cluster may need to be imaged (or re-imaged). For example, a customer may already have an operational cluster at a particular version. The customer may order an additional server/node and want to add it to the cluster. In this case, the new node may be re-imaged to match the existing version of the other nodes.

When a server in an HCI environment needs to be imaged, the common solution to image it offline. The server/node may be removed from a cluster in a production environment, and then it may be imaged to the desired version by an imaging tool outside the node, or it may be restored to a specific version by a recovery tool inside the node.

These procedures may cause issues, however. For example, the system downtime is significant, and there can be a large number of dependencies outside the server. Further, there can be limitations on the image version that is to be imaged onto the server. This disclosure provides techniques for a new Node Imaging System (NIS) that can provide live imaging to any desired version of a system image.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with imaging of information handling systems may be reduced or eliminated.

In accordance with embodiments of the present disclosure, an information handling system may include at least one processor; and a non-transitory memory coupled to the at least one processor. The information handling system may be a node of an information handling system cluster may be configured to be imaged while the node is operational within the information handling system cluster by: a node installation service executing on the node creating a partition on a storage medium of the node; the node installation service receiving an image bundle from a remote information handling system via a network and storing the image bundle on the partition; and the node installation service causing the node to reboot, wherein the rebooting is configured to install a new version of a management system to the node from the image bundle.

In accordance with these and other embodiments of the present disclosure, a method may include while a node of an information handling system cluster is operational within the information handling system cluster, a node installation service that is executing on the node creating a partition on a storage medium of the node; the node installation service receiving an image bundle from a remote information handling system via a network and storing the image bundle on the partition; and the node installation service causing the node to reboot, wherein the rebooting is configured to install a new version of a management system to the node from the image bundle.

In accordance with these and other embodiments of the present disclosure, an article of manufacture may include a non-transitory, computer-readable medium having computer-executable code thereon that is executable by a processor of an information handling system that is a node of an information handling system cluster for: executing a node installation service on the node to create a partition on a storage medium of the node; causing the node installation service to receive an image bundle from a remote information handling system via a network and storing the image bundle on the partition; and causing the node to reboot, wherein the rebooting is configured to install a new version of a management system to the node from the image bundle.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
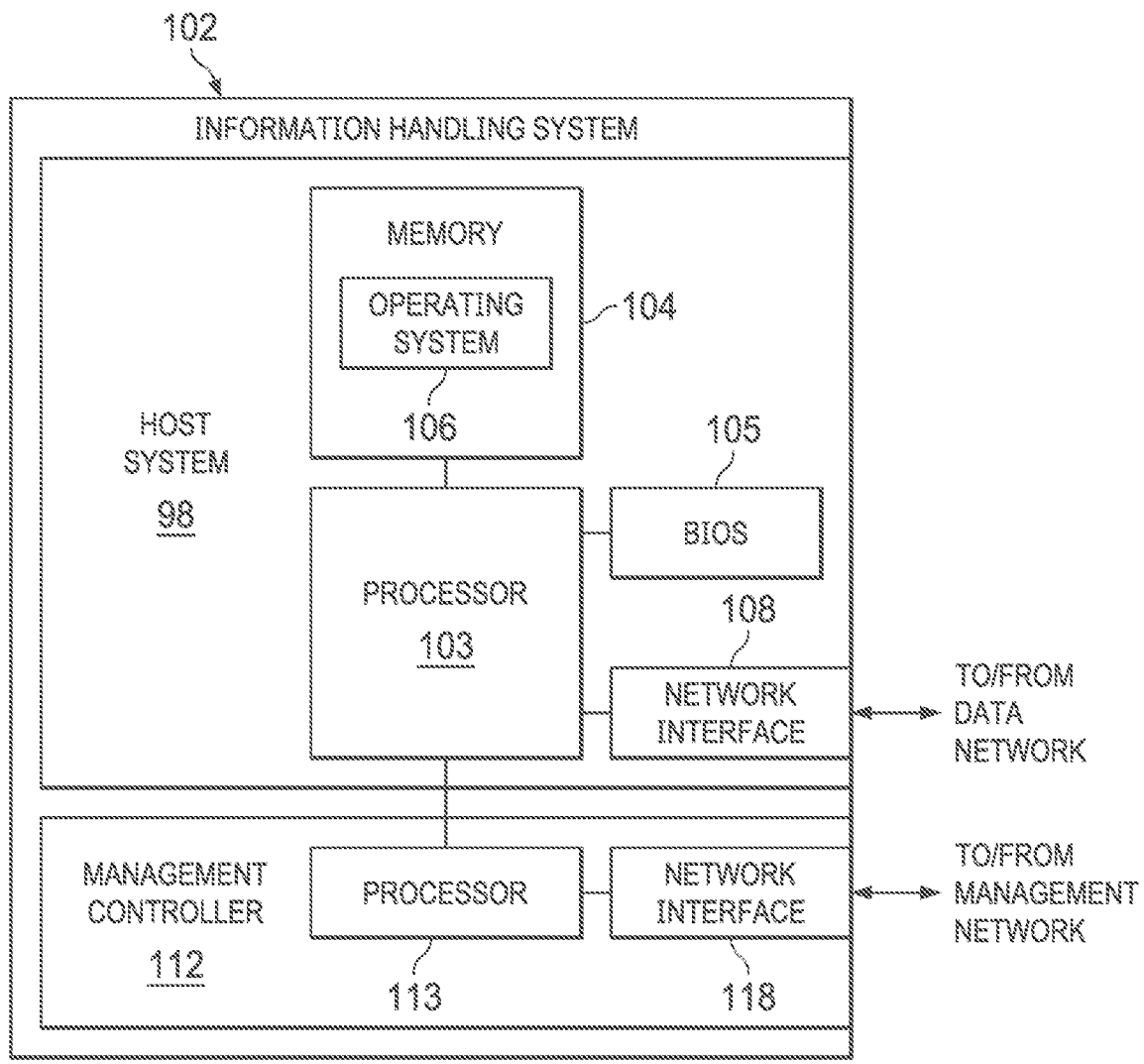
FIG. 1 illustrates a block diagram of an example information handling system, in accordance with embodiments of the present disclosure.
Figure 2:
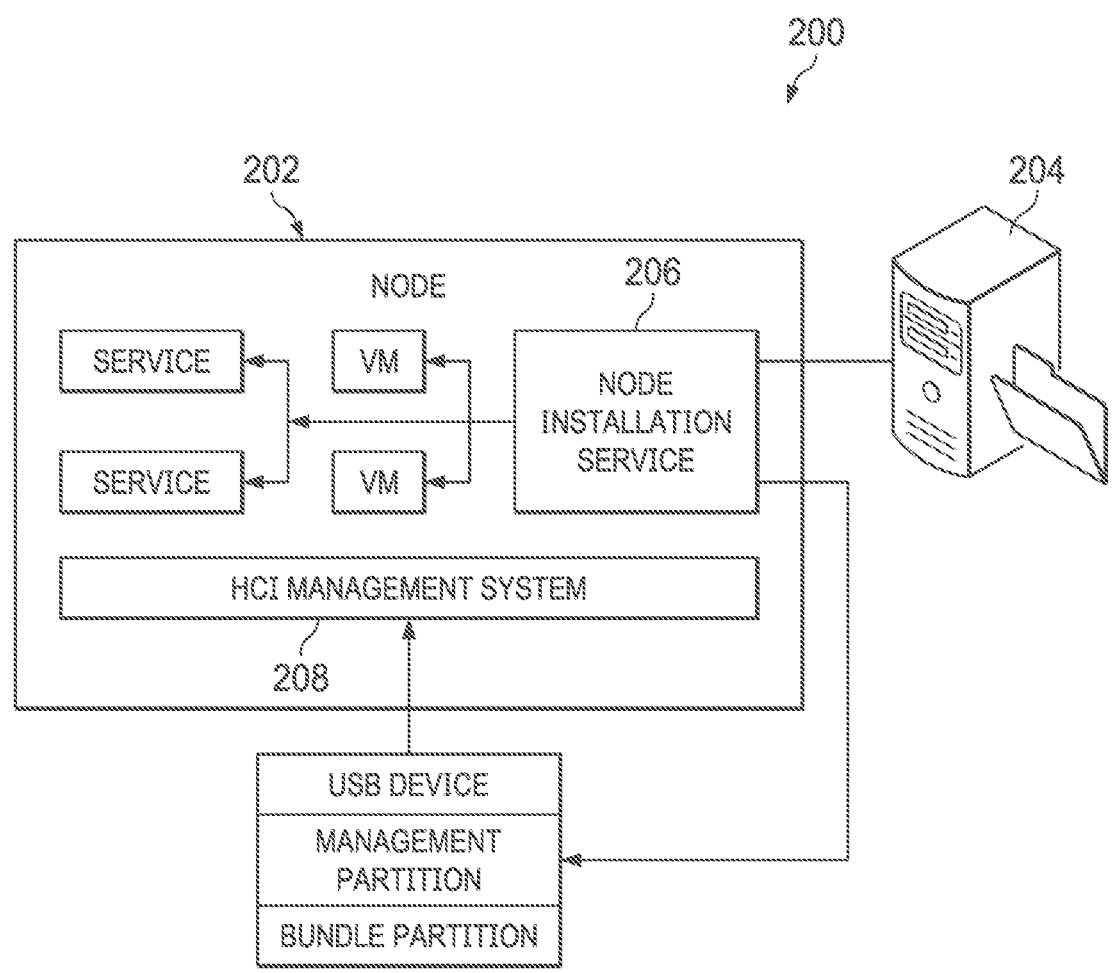
FIG. 2 illustrates a block diagram of an example imaging system, in accordance with embodiments of the present disclosure.

Preferred embodiments and their advantages are best understood by reference to FIGS. 1 and 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure may provide a Node Imaging System (NIS) that can provide live imaging of a server node to any desired version of a system image.

The NIS may provide for imaging servers in various environments (e.g., servers using an HCI management system such as the VMware® ESXi'm environment, or any other HCI management system). The NIS may provide an installation service to image the node itself when it is running, and the installation service may run on the HCI management system within the node.

The installation service may be delivered in an installation bundle that may be cryptographically signed by the maker of the HCI management system. For example, the installation service may be included in customized installation media (e.g., an ISO file) for the HCI management system. This delivery mechanism may ensure that the solution supports secure boot being enabled during the whole imaging process.

In some embodiments, the NIS may store an installer for the HCI management system on a USB device of the node, define its own "kickstart" scripts to install the HCI management system, and store the image bundle to the physical storage resources of the node. After the HCI management system is installed, the installation service may be started as a service and begin to install the product software to the node, including any desired installation bundles, advanced settings, virtualized storage operations, virtual machine deployment, etc. After the installation service bundle is installed, the installation status/progress can be queried from it. Meanwhile, a Serial Over LAN (SOL) or other connection may be enabled during the imaging phase, and so the imaging status can also be monitored by SOL. After the imaging process is completed, the SOL may be deactivated.

In some embodiments, an image bundle may include the installation ISO for the HCI management system (e.g., with the NIS installation service bundle customized into the ISO), and any additional desired installation bundles. Such bundles may include virtual machines, product installation scripts, kickstart scripts, etc.

Turning now to FIG. 2, a block diagram is shown of an example system 200 in which techniques according to this disclosure may be carried out, in accordance with some embodiments. As shown, system 200 may include node 202. Node 202 may include an HCI management system 208, as well as a node installation service (NIS) 206.

At a high level, an imaging process may take place as follows in some embodiments. First, the node installation service may create partitions on a USB device (e.g., a virtual USB device) of the node. These partitions may include a management partition for the installation media of the HCI management system to be imaged to the node, as well as one or more bundle partitions for any other components of the image bundle.

The node installation service 206 may download an image bundle from file server 204 and write the bundle to the USB device. Node installation service 206 may also update a boot loader configuration file for the HCI management system boot loader, as well as add a kickstart file. Once these components are in place, the node installation service 206 may reboot node 202.

The installation media for the HCI management system may then install the HCI management system 208. Once this is complete, the installation media may start the node installation service 206. Node installation service 206 may then install any product software, including any desired bundles, HCI management system advanced settings, virtualized storage operations, virtual machine deployment, etc.

From the workflow as described above, it may be seen that the NIS has no outside-node dependencies. The live imaging may be implemented by a NIS installation service while the node is running. Table 1 below shows a dependency comparison between the NIS according to this disclosure and a PXE installation.

TABLE 1

|  | Live NIS | PXE |
| --- | --- | --- |
| DHCP server | No need | Needed |
| TFTP server | No need | Needed |
| PXE-capable NIC | No need | Needed |

In some embodiments, HCI management system customizations may be used to add or remove custom drivers (e.g., via standard bundle formats). The live NIS may include a special imaging process to support secure boot. This may be accomplished by customizing the NIS installation service into a bundle that is included in the installation media (e.g., an ISO) for the HCl management system. The bundle may be officially cryptographically signed by the maker of the HCl management system, and so it may satisfy the secure boot requirements of the HCl management system.

In order to automatically install the HCl management system, a scripted installation method may be used. In this embodiment, a kickstart file may be used to tell the HCl management system installer how to install the HCl management system and how to install product software after such installation.

Usually, in order to invoke scripts to install product software, a % firstboot command or similar may be used in a kickstart file. This may ensure that the installation scripts only run during the first boot after the installation of the HCl management system. But in some systems, the % firstboot command will not be executed when secure boot is enabled.

In contrast, the kickstart file in the NIS according to this disclosure need not use the % firstboot command. Because the NIS installation service is customized into the ISO for the HCl management system, it will be run as a service after the HCl management system is installed. It thus may take charge of product software installation. This makes supporting secure boot feasible in the live NIS.

In some embodiments, the NIS may implement a REST API. An example API definition is shown below at Table 2.

TABLE 2

| URL | HTTP Method | Description |
| --- | --- | --- |
| /nis/build | POST | Start node imaging |
| /nis/build | GET | Query node imaging status |
| /nis/build/ | PUT | Update node imaging configuration |
| /nis/build/log | GET | Query node imaging log |
| /nis/bundle | POST | Upload node imaging bundle to node |
| /nis/bundle | GET | Query node imaging bundle on node |
| /nis/bundle | DELETE | Delete node imaging bundle from node |

This API and the example usages provided below are for the sake of clarity and exposition. As one of ordinary skill in the art with the benefit of this disclosure will appreciate, various other implementations are possible in any particular embodiment.

Example 1: Upload Node Imaging Bundle to a Node

Command:

```
curl -k --user <username> : <password> -X POST -H "Content-Type: application/json" -d '{"host_ip" : "<host_ip>", "bundle_url" : "<bundle_url>"}' https://<nis-ip>:<port>/VxPS/v1/nis/bundle
```

Example 2: Start Node Imaging

Command:

```
curl -k --user <username> : <password> -X POST -H "Content-Type: application/json" -d '{"host_ip" : "<host_ip>"}' https://<nis-ip> : <port>/VxPS/v1/nis/build
```

Example 3: Query Node Imaging Status

Command:

```
curl -k --user <username> : <password> -X GET -H "Content-Type: application/json" -d '{"host_ip" : "<host_ip>"}' https://<nis-ip>:<port>/VxPS/v1/nis/build
```

Accordingly, embodiments of this disclosure may provide many advantages. For example, mechanisms to support live imaging of a server within an HCl management system such as an ESXi environment have heretofore not been available. Further, the ability to support secure boot being enabled during the entire imaging phase has not been available.

Embodiments of this disclosure may decrease system downtime while node imaging, decrease outside dependencies, and make imaging versions more flexible. Further, the simultaneously imaging of multiple nodes may also be possible.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a non-transitory memory coupled to the at least one processor;
   wherein the information handling system is a node of an information handling system cluster; and
   wherein the node is configured to be imaged while the node is operational within the information handling system cluster and while secure boot is enabled for the node, wherein the imaging includes installing a new version of a management system to the node, by:
      enabling a serial over LAN (SOL) interface configured to provide monitoring information regarding the imaging;
      a node installation service executing on the node creating a partition on a storage medium of the node;
      the node installation service receiving an image bundle from a remote information handling system via a network and storing the image bundle on the partition;
      the node installation service updating a boot loader configuration file for the management system;
      the node installation service creating a kickstart file that indicates one or more actions to be taken with regard to the imaging of the node;
      the node installation service causing the node to reboot, wherein the rebooting is configured to install the new version of the management system to the node from the image bundle based on the boot loader configuration file an the kickstart file; and
      in response to completion of the installation, deactivating the SOL interface.

2. The information handling system of claim 1, further configured to:
   after installation of the new version of the management system, execute a new version of the node installation service.

3. The information handling system of claim 2, wherein the new version of the node installation service is included in the image bundle.

4. The information handling system of claim 3, wherein the new version of the node installation service is further configured to install additional software bundles.

5. The information handling system of claim 3, wherein the new version of the node installation service is cryptographically signed by a maker of the management system.

6. The information handling system of claim 1, wherein the cluster is a hyper-converged infrastructure (HCI) cluster.

7. The information handling system of claim 6, wherein the management system is an HCI management system.

8. A method for imaging a node of an information handling system cluster, wherein the imaging includes installing a new version of a management system to the node, the method comprising:
   while the node is operational within the information handling system cluster and while secure boot is enabled for the node, a node installation service that is executing on the node creating a partition on a storage medium of the node;
   the node installation service enabling a serial over LAN (SOL) interface configured to provide monitoring information;
   the node installation service receiving an image bundle from a remote information handling system via a network and storing the image bundle on the partition;
   the node installation service updating a boot loader configuration file for the management system;
   the node installation service creating a kickstart file that indicates one or more actions to be taken with regard to the imaging of the node;
   the node installation service causing the node to reboot, wherein the rebooting is configured to install the new version of the management system to the node from the image bundle based on the kickstart file; and
   in response to completion of the installation, deactivating the SOL interface.

9. The method of claim 8, wherein the storage medium is a Universal Serial Bus (USB) storage medium.

10. The method of claim 8, further comprising, after installation of the new version of the management system, executing a new version of the node installation service.

11. The method of claim 10, wherein the new version of the node installation service is included in the image bundle.

12. The method of claim 11, wherein the new version of the node installation service is further configured to install additional software bundles.

13. The method of claim 11, wherein the new version of the node installation service is cryptographically signed by a maker of the management system.

14. An article of manufacture comprising a non-transitory, computer-readable medium having computer-executable code thereon that is executable by a processor of an information handling system that is a node of an information handling system cluster for imaging the node, wherein the imaging includes installing a new version of a management system to the node by, while secure boot is enabled for the node:
   executing a node installation service on the node to create a partition on a storage medium of the node;
   causing the node installation service to enable a serial over LAN (SOL) interface configured to provide monitoring information;
   causing the node installation service to receive an image bundle from a remote information handling system via a network and storing the image bundle on the partition;
   causing the node installation service to update a boot loader configuration file for the management system;
   causing the node installation service to create a kickstart file that indicates one or more actions to be taken with regard to the imaging of the node;
   causing the node to reboot, wherein the rebooting is configured to install the new version of the management system to the node from the image bundle based on the kickstart file; and
   in response to completion of the installation, deactivating the SOL interface.

15. The article of claim 14, wherein the code is further executable for:
   after installation of the new version of the management system, executing a new version of the node installation service.

16. The article of claim 15, wherein the new version of the node installation service is included in the image bundle.

17. The article of claim 16, wherein the new version of the node installation service is further configured to install additional software bundles.

18. The article of claim 16, wherein the new version of the node installation service is cryptographically signed by a maker of the management system.

19. The article of claim 14, wherein the cluster is a hyper-converged infrastructure (HCI) cluster.

20. The article of claim 19, wherein the management system is an HCI management system.

* * * * *